United States Patent [19]

Haldric

[11] 4,361,024
[45] Nov. 30, 1982

[54] COUPLING CLAMP AND A METHOD OF MANUFACTURE THEREFOR

[75] Inventor: Bernard Haldric, Vendome, France

[73] Assignee: NACAM, France

[21] Appl. No.: 154,077

[22] Filed: May 28, 1980

[30] Foreign Application Priority Data

May 31, 1979 [FR] France .................... 79 13974

[51] Int. Cl.³ ............................................. B21D 53/36
[52] U.S. Cl. .................................... 72/379; 403/290; 403/373
[58] Field of Search .................... 72/327, 379; 29/150, 29/175 R, 175 A; 403/157, 290, 344, 373, 313; 24/129 B, 135 K

[56] References Cited

U.S. PATENT DOCUMENTS

| | | | |
|---|---|---|---|
| 1,553,060 | 9/1925 | Anderson | 29/175 A |
| 1,903,863 | 4/1933 | Hayden | 29/175 A |
| 1,994,428 | 3/1935 | Keil | 72/379 |
| 3,923,409 | 12/1975 | Stoner | 403/373 |

FOREIGN PATENT DOCUMENTS 2806094 4/1978 Fed. Rep. of Germany ........ 72/327

Primary Examiner—Lowell A. Larson
Attorney, Agent, or Firm—Robert E. Burns; Emmanuel J. Lobato; Bruce L. Adams

[57] ABSTRACT

The present invention relates to coupling clamps formed from a sheet-metal blank or tube length and of the type comprising an axially slotted hollow hub forming a socket for a shaft or other transmission member and having a lug depending from either side of the slot, the lugs being planar and pierced for the passage of a bolt or the like by the operation of which the clamp can be tightened to bear radially onto the shaft.

11 Claims, 4 Drawing Figures

COUPLING CLAMP AND A METHOD OF MANUFACTURE THEREFOR

In couplings wherein double thickness lugs are formed by folding parts of the blank upon themselves, it is known to machine bearing faces in the outer surfaces of the lugs to offer better support to the bolt head and nut.

However, if such a machining operation were to be performed on unfolded, single-thickness, lugs, and thus of relatively slight thickness, it would result in a dangerous reduction in lug thickness giving rise to the risk of fracture, especially in the regions where the lugs join the hub, which regions are radially stressed when the coupling is clamped on to a shaft.

The object of the present invention is to overcome the above stated drawbacks by providing a coupling clamp with unfolded, single-thickness, lugs and local support for a bolt head and nut.

According to the present invention, a coupling clamp of the above type is characterised in that each lug has a boss or like upstanding protrusion in the outer surface thereof about the bolt hole therein and a corresponding recess or depression in the inner surface thereof.

Such a boss or protrusion performs the double function of providing a bolt head or nut support and stiffening the lug, the struck boss or protrusion being formed by a striking operation to the inner surface of the lug causing lug material to be outwardly displaced.

In one embodiment of the invention, the boss is an upstanding crown or crown sector with the overall depth of the bolt hole being substantially greater than the thickness of the rest of the lug.

In a preferred embodiment of the invention, the coupling clamp forms one yoke of a universal joint by the provision of two yoke arms which are connected to the hub.

The invention is illustrated, by way of example, in the Drawing, wherein.

Figure 1:
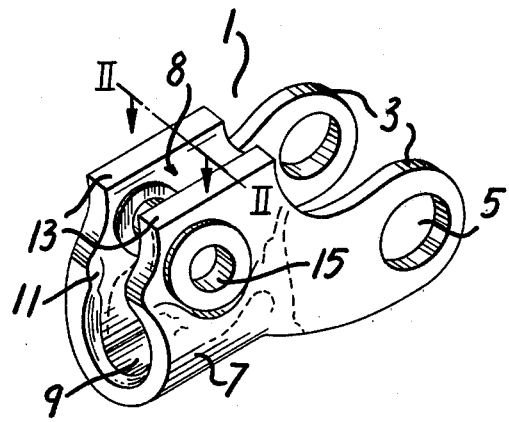
FIG. 1 is a perspective view of a coupling clamp and universal joint yoke in accordance with the invention.

FIG. 1 shows a coupling clamp and universal joint yoke 1 formed mainly by cutting and folding a sheet-metal blank or flat steel plate or a tube length in known manner to have a generally cylindrical hollow hub 7 with an axial slot 8 to either side of which depends a lug 13. The lugs are pierced by holes 15 for the passage of a bolt (not shown) the screwing of which into a nut acts to draw one lug towards the other. By this means a shaft or like transmission member (not shown) fitted in the socket 9 formed by the inside of the hub 7 is held by radial pressure of the clamp on to the shaft.

A pair of universal joint arms 3 are formed with the clamp hub 7, each arm having a bore 5, formed for example by punching, to receive a rolling or plain bearing (not shown).

In order to increase the resistance of the planar lugs 13 to the forces generated by tightening the bolt and to provide a better support for the bolt head and nut, the outer surface 17 of each lug is provided with an upstanding boss 19 in the form of a crown or crown sector about the bolt hole 15. The boss 19 is shown by FIG. 2 to protrude by a height "L" from the outer lug surface 17 and could extend to a distance equal to the external diameter of the hub 7, as shown by FIG. 3.

Figure 2:
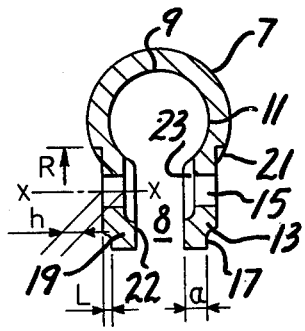
FIG. 2 is a section on the line II—II of FIG. 1.
Figure 3:
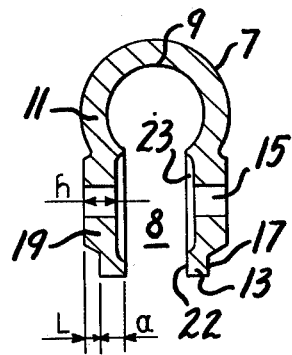
FIG. 3 is a similar section to that of FIG. 2, but for another embodiment of the invention.

The boss 19 is shown by FIG. 2 to be of such a radial size that it meets the hub in a region 11, where the lugs 13 connect with the hub, this necessitating the provision of a part-circular relief 21 in the outer surface of the hub to enable a full crown, of radius "R" from the common axis X—X of the bolt holes 15, to be formed.

In the embodiment shown by FIG. 2, the depth "h" of a bolt hole 15 is quite close, i.e. equal to or slightly greater or less than, the thickness "e" of the rest of the lug (i.e. the thickness of the sheet-metal blank). Whereas, in the embodiment shown by FIG. 3, the bolt hole depth "h" is clearly greater than the lug thickness "e".

The boss 19 is formed in each lug 13 by creating, such as by a striking operation, a recess or depression 23 in the inner surface 22 of the lugs and thus displacing material outwardly to form the boss in the outer lug surface 17. The dimensions (radius, depth) of the recess 23 may either be substantially equal to those of the boss 19, giving rise to the embodiment of FIG. 2 or different therefrom, especially with regard to greater radius, if a boss of greater height is required, as shown by FIG. 3.

The striking operation to displace lug material is generally a cold upsetting process to be followed by the formation of the bolt holes 15, for example by simple punching.

The boss 15 may, of course, have different shapes and, especially, might be of a part-circular shape having, for example, an included angle of between 150° and 300°.

Figure 4:
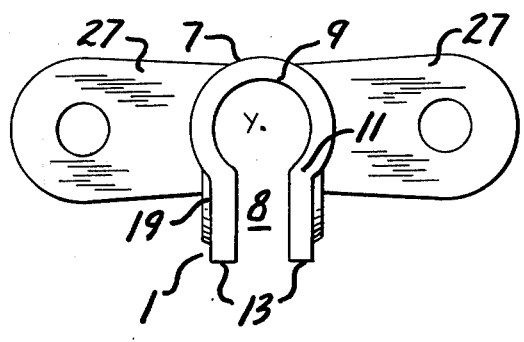
FIG. 4 is an end elevation of a further embodiment of the invention.

FIG. 4 shows another embodiment of the invention that is generally similar to those described above, similar parts having been given similar references, but for connecting a shaft to, for example, a flexible disc. Here, the hub 7 has at least one, and preferably two, flanges 27 bent outwardly in a plane substantially perpendicular to that of the hub axis Y.

I claim:

1. A method of forming from a metal blank a coupling clamp having an axially-slotted hollow hub forming a socket for a shaft and lugs projecting from opposite sides of said slot, the lugs being planar and pierced by a hole for the passage of a bolt for tightening the clamp to bear radially on the shaft, the method comprising the step of submitting the inner surface of each lug to a striking operation to cause lug material to be outwardly displaced to form on the outer surface of each lug a raised boss surrounding the bolt hole and to form a recess on the inner surface of the lug.

2. A method according to claim 1, in which the thickness of said boss formed by said striking operation is greater than that of other portions of the lug.

3. A method according to claim 1, in which the thickness of said boss formed by said striking operation is approximately equal to the thickness of other portions of the lug.

4. A method according to claim 1, in which the metal forming said bosses is displaced sufficiently that the distance between outer faces of said bosses is approximately equal to the outer diameter of said hub.

5. A method according to claim 1, in which the bosses formed by said striking operations are of a radius such that said bosses meet the outer surface of said hub.

6. A method according to claim 1, in which the radius of said recess formed by said striking operation is approximately equal to the radius of said boss.

7. A method according to claim 1, in which the radius of said recess formed by said striking operation is greater than the radius of said boss.

8. A method according to claim 1, in which said clamp is formed from sheet metal by cutting, punching and bending a sheet metal blank.

9. A method according to claim 8, in which said bolt holes are formed by a punching operation following said striking operation.

10. A method according to claim 9, in which said cutting, punching, bending and striking operations are performed cold.

11. A method according to claim 1, in which said metal blank is formed further to provide two yoke arms connected to said hub.

* * * * *